(12) United States Patent
Lee et al.

(10) Patent No.: US 8,005,758 B2
(45) Date of Patent: Aug. 23, 2011

(54) ENCRYPTION/DECRYPTION METHOD AND APPARATUS FOR CONTROLLING CONTENT USE BASED ON LICENSE INFORMATION

(75) Inventors: Sun-nam Lee, Suwon-si (KR); Myung-sun Kim, Uiwang-si (KR); Sung-hyu Han, Seoul (KR); Young-sun Yoon, Suwon-si (KR); Jae-heung Lee, Suwon-si (KR); Bong-seon Kim, Seongnam-si (KR); Moon-young Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 709 days.

(21) Appl. No.: 11/402,859

(22) Filed: Apr. 13, 2006

(65) Prior Publication Data

US 2007/0203838 A1 Aug. 30, 2007

Related U.S. Application Data

(60) Provisional application No. 60/670,701, filed on Apr. 13, 2005.

(30) Foreign Application Priority Data

May 27, 2005 (KR) .................. 10-2005-0045204

(51) Int. Cl.
*G06Q 99/00* (2006.01)

(52) U.S. Cl. ............... 705/59; 705/50; 705/51; 705/52; 705/57; 705/58; 726/26; 726/27; 726/28; 726/29; 726/30; 380/200; 380/201; 380/202; 380/203

(58) Field of Classification Search ............ 705/50–59; 726/26–33; 380/200–203
See application file for complete search history.

(56) References Cited

U.S. PATENT DOCUMENTS

| 2002/0002468 | A1 | 1/2002 | Spagna et al. | |
| 2005/0234826 | A1* | 10/2005 | Ohmori et al. | 705/51 |
| 2006/0059573 | A1* | 3/2006 | Jung et al. | 726/31 |
| 2006/0190621 | A1* | 8/2006 | Kamperman et al. | 709/245 |
| 2007/0198417 | A1* | 8/2007 | Alve | 705/51 |

FOREIGN PATENT DOCUMENTS

| JP | 11-85848 A | 3/1999 |
| JP | 2000-020600 A | 1/2000 |
| KR | 2000-0050143 A | 8/2000 |
| KR | 2001-0050111 A | 6/2001 |
| KR | 2002-0022283 A | 3/2002 |

OTHER PUBLICATIONS

Iannella, R., Digital Rights Management (DRM) Architectures, Jun. 2001, D-Lib Magazine, vol. 7 No. 6.*

* cited by examiner

*Primary Examiner* — Jalatee Worjloh
(74) *Attorney, Agent, or Firm* — Sughrue Mion, PLLC

(57) ABSTRACT

A method and apparatus for encrypting or decrypting digital content are provided. In the method, a binding range is selected from a plurality of binding ranges of content use based on license information of the content, and the content is encrypted based on the selected binding range so that the content can be used only within the selected binding range. Accordingly, it is possible to limit content use to a plurality of binding ranges of use of the content, using license information of the content.

8 Claims, 8 Drawing Sheets

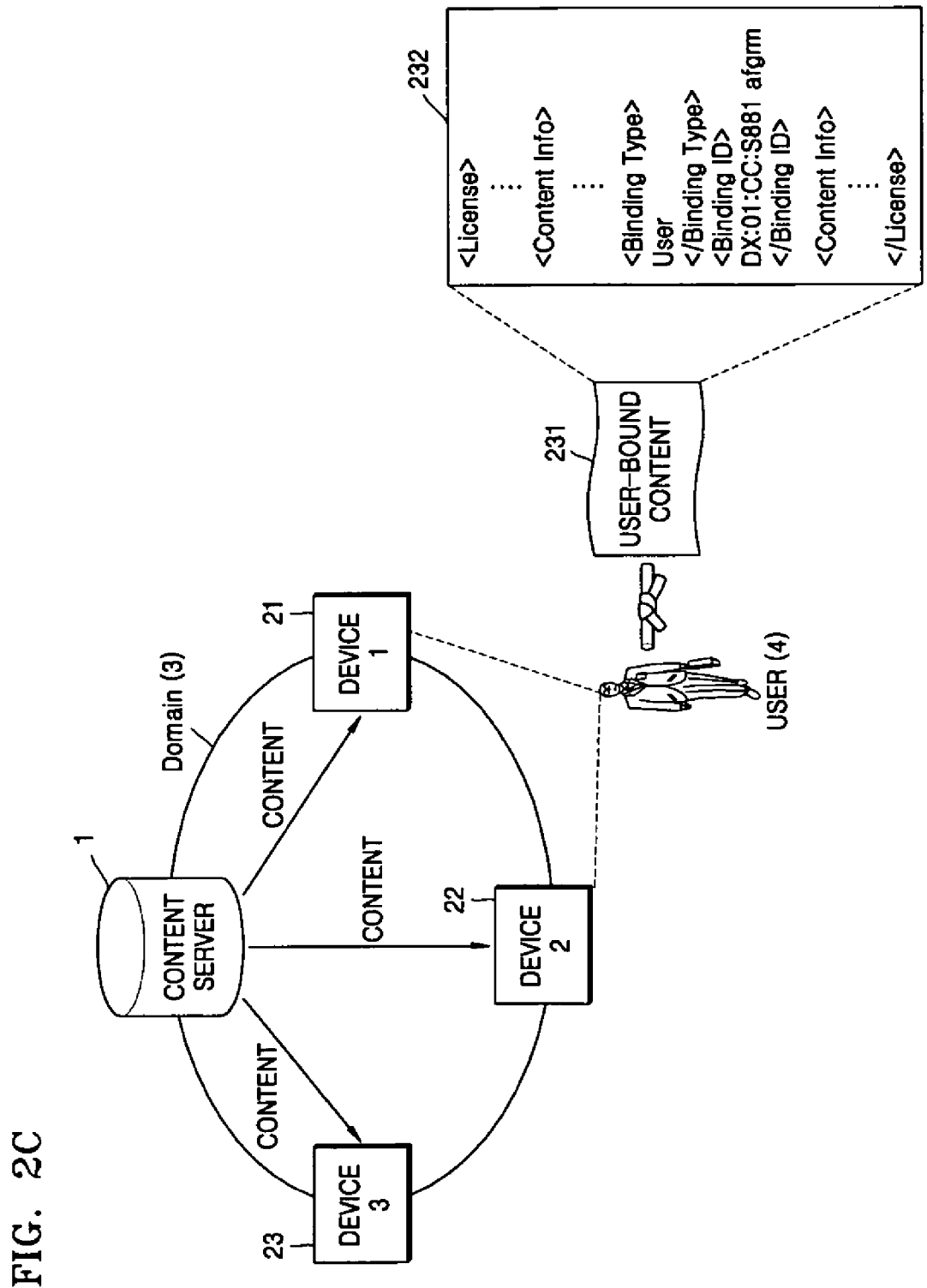

ENCRYPTION/DECRYPTION METHOD AND APPARATUS FOR CONTROLLING CONTENT USE BASED ON LICENSE INFORMATION

CROSS-REFERENCE TO RELATED PATENT APPLICATIONS

This application claims the priorities of U.S. Provisional Patent Application No. 60/670,701, filed on Apr. 13, 2005, and Korean Patent Application No. 10-2005-0045204, filed on May 27, 2005, in the Korean Intellectual Property Office, the disclosures of which are incorporated herein in their entirety by reference.

BACKGROUND OF THE INVENTION

1. Field of the Invention

The present invention relates digital content protection.

2. Description of the Related Art

Recently, transmission of digital content via various types of communication media, such as the Internet, terrestrial broadcasting, cable, and satellite; and selling or rental of digital content using large capacity storage media, such as compact discs (CDs) and digital versatile discs (DVDs), have become common place. Thus, digital rights management (DRM) that is a means of protecting copyright of digital content has become an important issue. In particular, research is being conducted into the fields of digital content protection, in which an authorized user over a home domain can receive various content services from devices belonging to the home domain under the DRM.

In particular, since the quality of a copy of digital content is the same as that of the original digital content, indiscriminate copying of digital content must be prevented. Furthermore, as a range of a right of digital content becomes diversified, limiting of the range of use of the digital content to various types of ranges thereof is required. However, a specific mechanism of limiting content use to various types of ranges of use of the content has yet to be proposed.

SUMMARY OF THE INVENTION

The present invention provides an apparatus and method for limiting content use to various types of binding ranges of content use.

The present invention also provides a computer readable recording medium having embodied thereon a program for executing the method in a computer.

According to an aspect of the present invention, there is provided an encryption method comprising selecting one of a plurality of binding ranges of content use based on license information of the content; and encrypting the content based on the selected binding range so that the content is available within only the selected binding range.

According to another aspect of the present invention, there is provided an encrypting apparatus comprising a selecting unit selecting one of a plurality of binding ranges of content use based on license information of the content; and an encryption unit encrypting the content based on the selected binding range so that the content is available within only the selected binding range.

According to another aspect of the present invention, there is provided a computer readable recording medium having embodied thereon a program for executing the encryption method in a computer.

According to another aspect of the present invention, there is provided a decryption method comprising perceiving one of a plurality of binding ranges of content use based on license information of the content; and decrypting the content, which is encrypted to be available within only the perceived binding range, based on the perceived binding range.

According to another aspect of the present invention, there is provided an apparatus for decrypting content, the apparatus including a perceiving unit perceiving one of a plurality of binding ranges of content use based on license information of the content; and a decryption unit decrypting content, which is encrypted to be available within only the perceived binding range, based on the perceived binding range.

According to another aspect of the present invention, there is provided a computer readable recording medium having embodied thereon a program for executing the decryption method in a computer.

According to still another aspect of the present invention, there is provided a method of controlling content use, the method including selecting one of a plurality of binding ranges of use of the content based on license information of the content, and encrypting the content based on the selected binding range, so that the content is available within only the selected binding range; and perceiving the binding range based on the license information, and decrypting the encrypted content based on the perceived binding range.

According to still another aspect of the present invention, there is provided a computer readable recording medium having embodied thereon a data structure that includes a first field indicating one of a plurality of binding ranges of use of the content, and a second field indicating identification of the binding range indicated in the first field.

BRIEF DESCRIPTION OF THE DRAWINGS

The above and other aspects of the present invention will become more apparent by describing in detail exemplary embodiments thereof with reference to the attached drawings in which:

FIGS. 2A through 2C are illustrations of a system of controlling content use and formats of license information according to exemplary embodiments of the present invention;

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
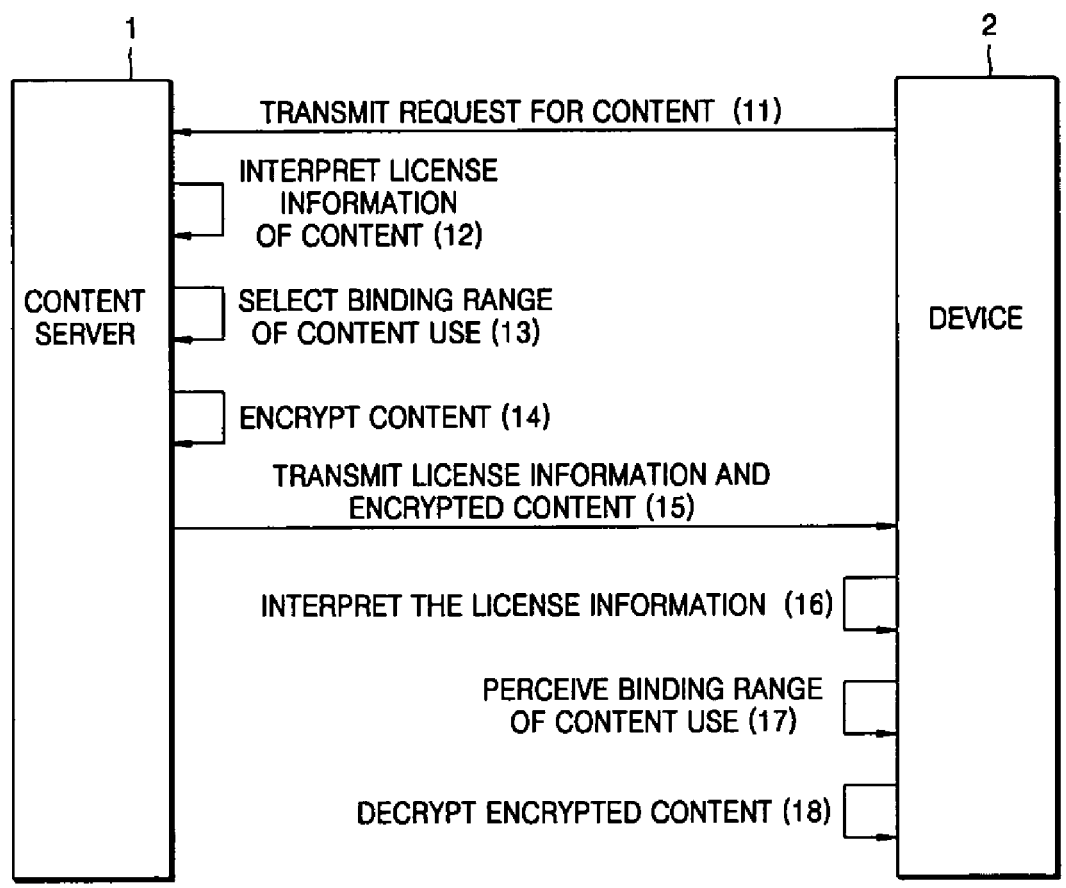
FIG. 1 is a flowchart illustrating a method of controlling content use according to an exemplary embodiment of the present invention.

FIG. 1 is a flowchart illustrating a method of controlling content use according to an exemplary embodiment of the present invention. Referring to FIG. 1, the method includes operations that are performed between a content server 1 and a device 2 according to a time sequence. The content server 1 provides the content and the device 2 uses the content.

Specifically, in operation 11, the device requests the content server 1 to provide content.

In operation 12, the content server 1 interprets license information of the content requested in operation 11.

In operation 13, the content server 1 selects one of a plurality of binding ranges of use of the content based on the license information interpreted in operation 12. Representative examples of the plurality of the binding ranges of use are a domain having a plurality of devices, one of the devices, and a predetermined user of the domain.

In particular, in operation 13, the content server 1 can freely limit a binding range of use of the content based on only a license information format by selecting one of the binding ranges of use with reference to the predetermined element commonly applied to the plurality of the binding ranges among elements of the license information.

In operation 14, the content server 1 makes the license information based on the binding range selected in operation 13 and then encrypts the content so that the content can be used within only the selected binding range.

In operation 15, the content server 1 transmits the license information and the content encrypted in operation 14 to the device 2.

In operation 16, the device 2 interprets the license information received in operation 15.

In operation 17, the device 2 perceives one from among the binding ranges of use of the content according to the license information interpreted in operation 16.

In operation 18, the device 2 decrypts the encrypted content received in operation 15 according to the binding range perceived in operation 17 so that the content can be used within only the binding range perceived in operation 17.

Figure 2A:
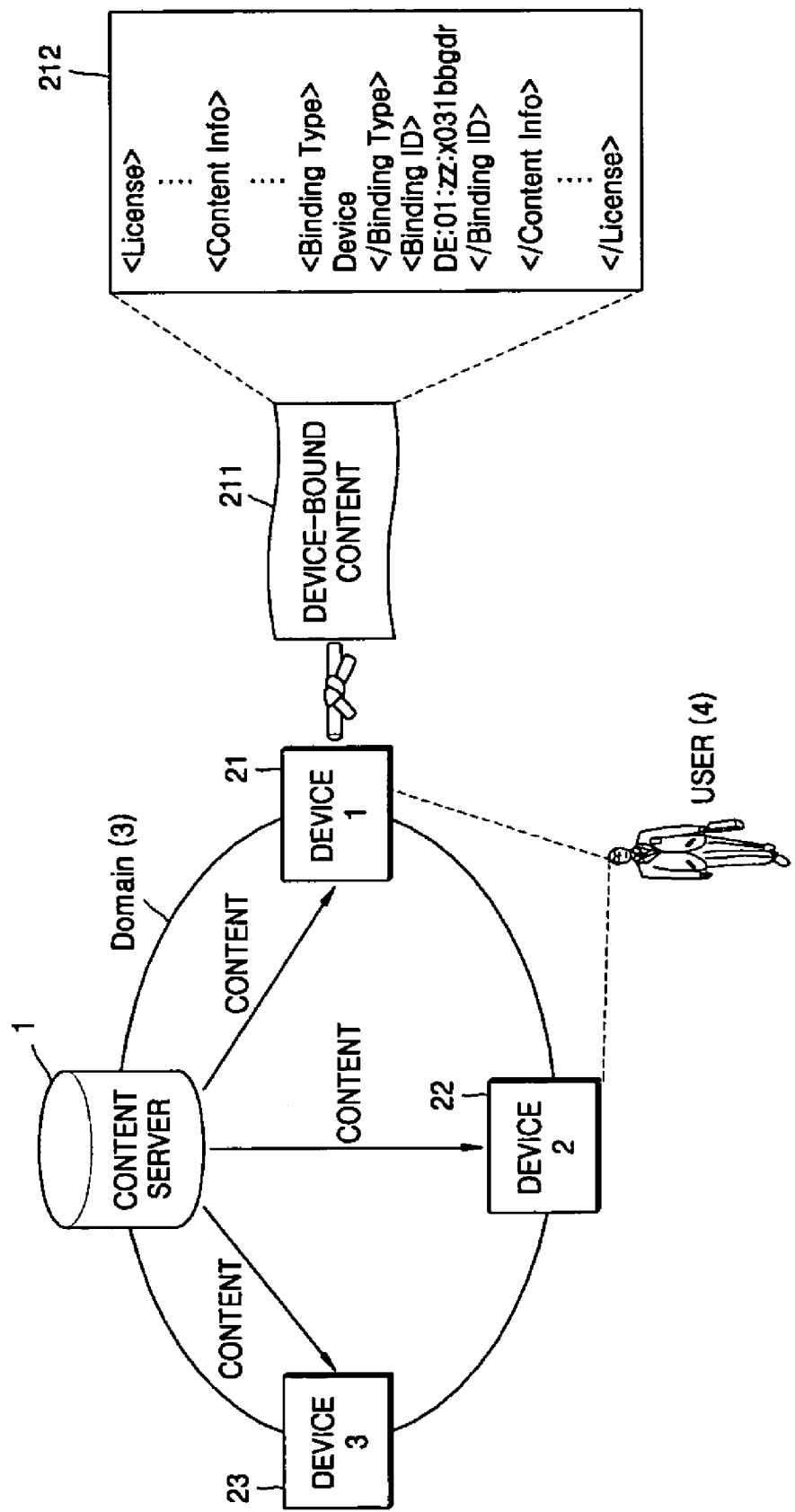
Figure 2B:
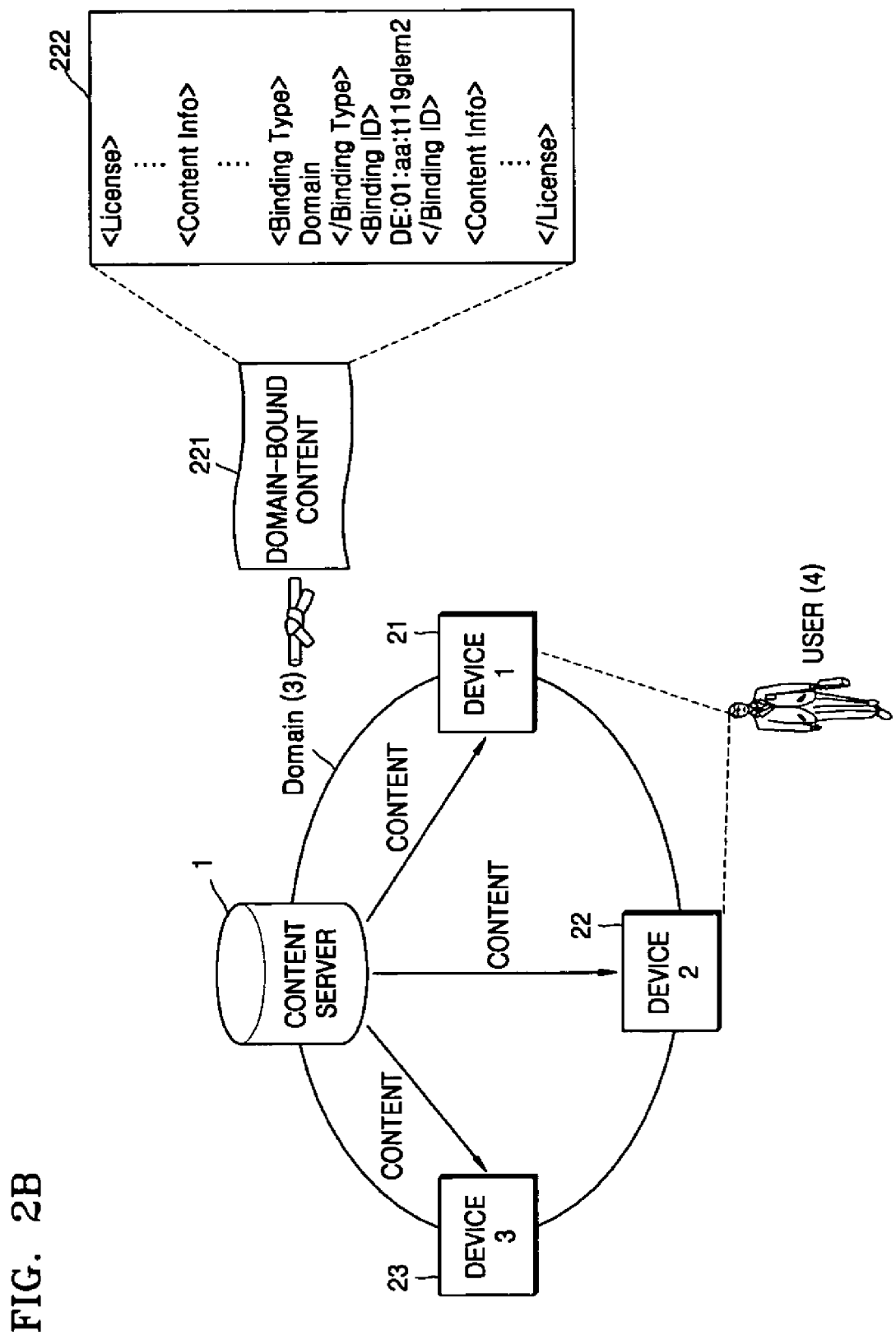

FIGS. 2A through 2C are illustrations of a system of controlling content use and formats of license information according to exemplary embodiments of the present invention. Referring to FIGS. 2A through 2C, the system includes a content server 1 and first, second, and third devices 21, 22, and 23. Here, the content server 1 corresponds to the content server 1 of FIG. 1, and the first through third devices 21 through 23 correspond to the device 2 of FIG. 1. The content server 1 and the first through third devices 21 through 23 will be described in greater detail with reference to FIGS. 3 and 4.

FIG. 2A illustrates that the binding range of content use corresponds to one of the first through third devices 21 through 23, FIG. 2B illustrates that the binding range of content use corresponds to a domain 3, and FIG. 2C illustrates that the binding range of content use corresponds to a user 4. In the present exemplary embodiment, each of license information 212, 222, and 232 is comprised of a binding type field, a binding identification (ID) field, and other fields, which are commonly applied to a various types of binding ranges of content use.

The binding type field indicates one of a plurality of binding ranges of content use. For instance, referring to FIG. 2A, "Device" is recorded in a binding type field of the license information 212, that is, the binding type field indicates that the binding range of content use is limited to one of the first through third devices 21 through 23. Referring to FIG. 2B, "Domain" is recorded in a binding type field of the license information 222, that is, the binding type field indicates that the binding range of content use is limited to the domain 3. Referring to FIG. 2C, "User" is recorded in a binding type field of the license information 232, that is, the binding type field indicates that the binding range of content use is limited to the user 4 of the first and second devices 21 and 22.

The binding ID field indicates the ID of the binding range indicated in the binding type field. For instance, since "Device" is recorded in the binding type field of the license information 212 of FIG. 2A, the ID of one of the first through third devices 21 through 24 is recorded in the binding ID field of the license information 212. Since "Domain" is recorded in the binding type field of the license information 222 of FIG. 2B, the ID of the domain 3 is recorded in the binding ID field of the license information 222. Similarly, since "User" is recorded in the binding type field of the license information 232 of FIG. 2C, the ID of the user 4 of the first and second devices 21 and 22, respectively, is recorded in the binding ID field of the license information 232.

Figure 3:
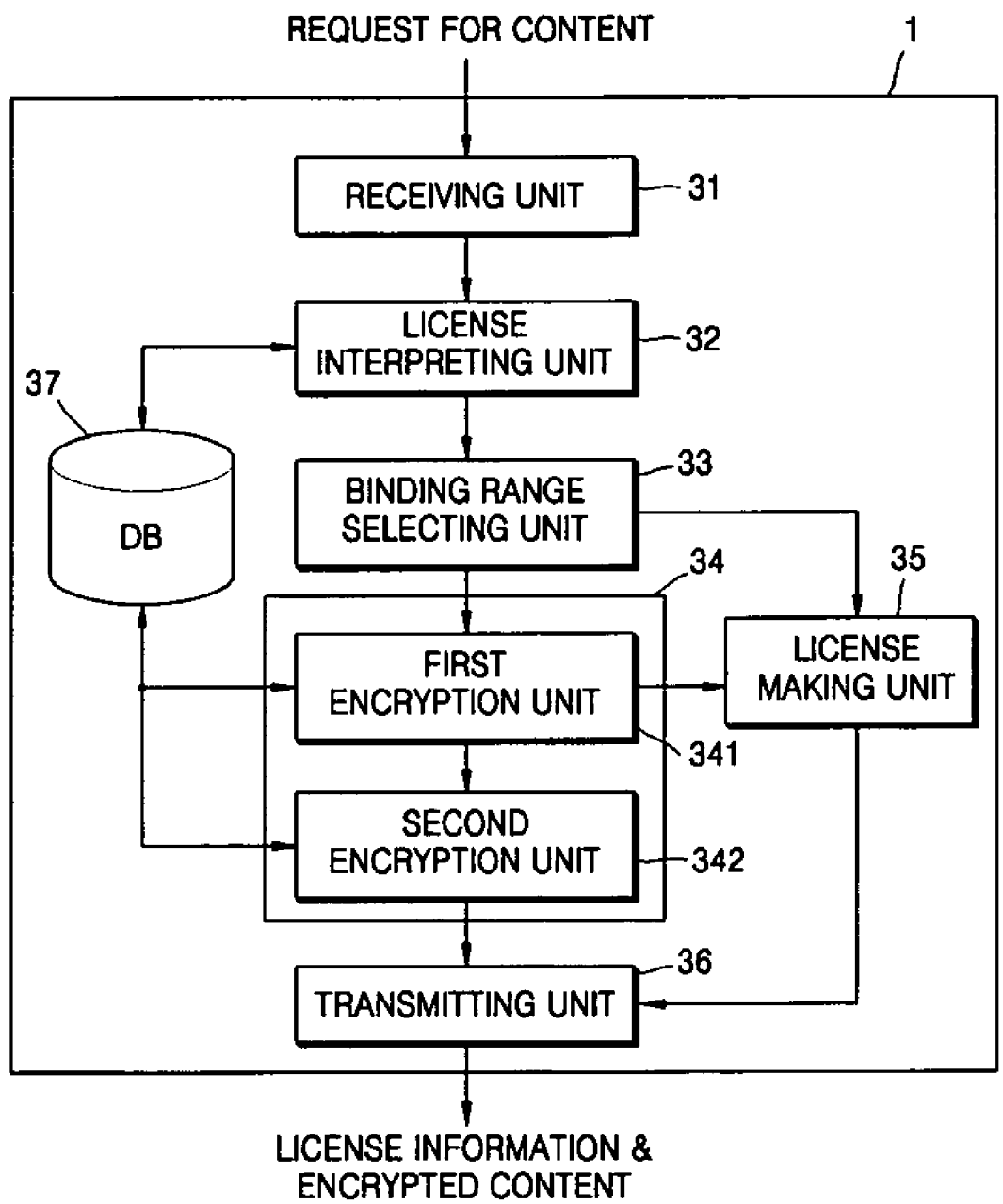
FIG. 3 is a block diagram of an apparatus for encrypting content according to an exemplary embodiment of the present invention.

FIG. 3 is a block diagram of an apparatus for encrypting content according to an exemplary embodiment of the present invention. Referring to FIG. 3, the apparatus is installed in the content server 1 of FIG. 1, and includes a receiving unit 31, a license interpreting unit 32, a binding range selecting unit 33, an encryption unit 34, a license making unit 35, a transmitting unit 36, and a database 37.

The receiving unit 31 receives a request for content from the device 2.

The license interpreting unit 32 reads, from the database 37, the license information regarding the content specified in the request received by the receiving unit 31, and interprets the license information according to a license information format such as that illustrated in FIG. 2A, 2B, or 2C so as to determine elements of the license information.

The binding range selecting unit 33 selects one of a plurality of binding ranges of use of the content based on the license information interpreted by the license interpreting unit 32. In detail, the binding range selecting unit 33 selects one from among the binding ranges of use of the content based on the predetermined element applied to the ranges of use among the elements of the license information, i.e., a binding type field, of the license information interpreted by the license interpreting unit 32, the predetermined element being applied to the binding ranges of use.

For instance, referring to FIG. 2A, the binding range selecting unit 33 selects a device from among the binding ranges of content use, e.g., a device, a domain, and a user, based on the binding type field of the license information 212 interpreted by the license interpreting unit 32. Referring to FIG. 2B, the binding range selecting unit 33 selects a domain from among the binding ranges of content use, e.g., a device, a domain, and a user, based on the binding type field of the license information 222 interpreted by the license interpreting unit 32. Also, referring to FIG. 2C, the binding range selecting unit 33 selects a user from among the binding ranges of use of content, e.g., a device, a domain, and a user, based on the binding type field of the license information 232 interpreted by the license interpreting unit 32.

The encryption unit 34 encrypts the content according to a predetermined encryption algorithm based on the binding range selected by the binding range selecting unit 33, so that the content can be used within only the selected binding range. More specifically, the encryption unit 34 encrypts the content according to the predetermined encryption algorithm based on the ID of the binding range, which is recorded in a binding ID field of the license information by the binding range selecting unit 33, so that the content can be used within only the binding range selected by the binding range selecting unit 33.

For instance, referring to FIG. 2A, the encryption unit 34 encrypts the content according to the predetermined encryption algorithm based on the ID of the device, which is recorded in the binding ID field of the license information 212 by the license making unit 35, so that the content can be used within only the device selected by the binding range selecting unit 33. Referring to FIG. 2B, the encryption unit 34 encrypts the content according to the predetermined encryption algorithm based on the ID of the domain, which is recorded in the binding ID field of the license information 222 by the license making unit 35, so that the content can be used within only the domain selected by the binding range selecting unit 33. Also, referring to FIG. 2C, the encryption unit 34 encrypts the contents according to the predetermined encryption algorithm based on the ID of the user, which is recorded in the binding ID field of the license information 232 by the license making unit 35, so that the content can be used within only the user selected by the binding range selecting unit 33.

The encryption unit 34 includes a first encryption unit 341 and a second encryption unit 342.

The first encryption unit 341 encrypts a content key using an encryption key corresponding to the binding range selected by the binding range selecting unit 33. More specifically, the first encryption unit 341 encrypts the content key according to the predetermined encryption algorithm, using a key corresponding to the binding range selected by the binding range selecting unit 33, i.e., the encryption key that matches the ID of the device, which is recorded in the binding ID field of the license information by the license making unit 35, so that the content can be used within only the selected binding range.

For instance, referring to FIG. 2A, in order to allow the content to be available to only a device selected by the binding range selecting unit 33, the first encryption unit 341 encrypts the content key according to the predetermined encryption algorithm, using the ID of the selected device, which is recorded in the binding ID field of the license information 212 by the license making unit 35. Referring to FIG. 2B, in order to allow the content to be available to only a domain selected by the binding range selecting unit 33, the first encryption unit 341 encrypts the content key according to the predetermined encryption algorithm, using the ID of the domain, which is recorded in the binding ID field of the license information 222 by the license making unit 35. Also, referring to FIG. 2C, in order to allow the content to be available to only a user selected by the binding range selecting unit 33, the first encryption unit 341 encrypts the content according to the predetermined encryption algorithm, using the ID of the user, which is recorded in the binding ID field of the license information 232 by the license making unit 35.

As described above, the ID to be recorded in the binding ID field by the license making unit 35 can be used as an encryption key, and the format of the ID is determined according to the predetermined encryption algorithm applied to the present exemplary embodiment. For instance, in the present embodiment, when the predetermined encryption algorithm uses a secret key cryptographic system, the format of the ID to be recorded in the binding ID field of the license information 232 by the licensing making unit 35, is a secret key. That is, the content server 1 and the device 2 share the secret key. The content server 1 encrypts the content key using the secret key, and the device 2 decrypts the encrypted content key using the secret key.

If the predetermined encryption algorithm uses a public key cryptographic system, the format of the ID to be recorded in the binding ID field of the license information 232 by the license making unit 35 is a public key. That is, the content server 1 and the device 2 share the public key. The device 2 has a private key that matches the public key. The content server I encrypts the content key using the public key, and the device 2 decrypts the encrypted content key using the private key that matches the public key.

The second encryption unit 342 encrypts the content using the content key encrypted by the first encryption unit 341.

The license making unit 35 makes the license information, which is to be referred to by a device, a domain, or a user that has a right of use of the content, by recording the binding range selected by the binding range selecting unit 33 in the binding type field of the license information and the ID of the selected binding range in the binding ID field of the license information. If the license information interpreted by the license interpreting unit 32 is identical to that made by the license making unit 32, the licensing making unit 35 may accept the interpreted license information without changing it. The license information includes the content key encrypted by the first encryption unit 341.

For instance, referring to FIG. 2A, the license making unit 35 records the ID of the device having a right of use of the content in the binding ID field of the license information 212 so that the content can be available to only the device selected by the binding range selecting unit 33. Referring to FIG. 2B, the license making unit 35 records the ID of the domain having a right of use of the content in the binding ID field of the license information 222 so that the content can be available to only the domain selected by the binding range selecting unit 33. Also, referring to FIG. 2C, the encryption unit 34 encrypts the content key using the ID of the user who has a right of use of the content, which is to be recorded in the binding ID field of the license information 232, so that the content can be available to only the user selected by the binding range selecting unit 33.

The transmitting unit 36 transmits the license information made by the license making unit 35 and the content encrypted by the second encryption unit 342 to the device 2.

The database 37 stores content and license information thereof. The content and license information thereof may be collected via either a network, such as the Internet, or a recording medium, such as a DVD.

Figure 4:
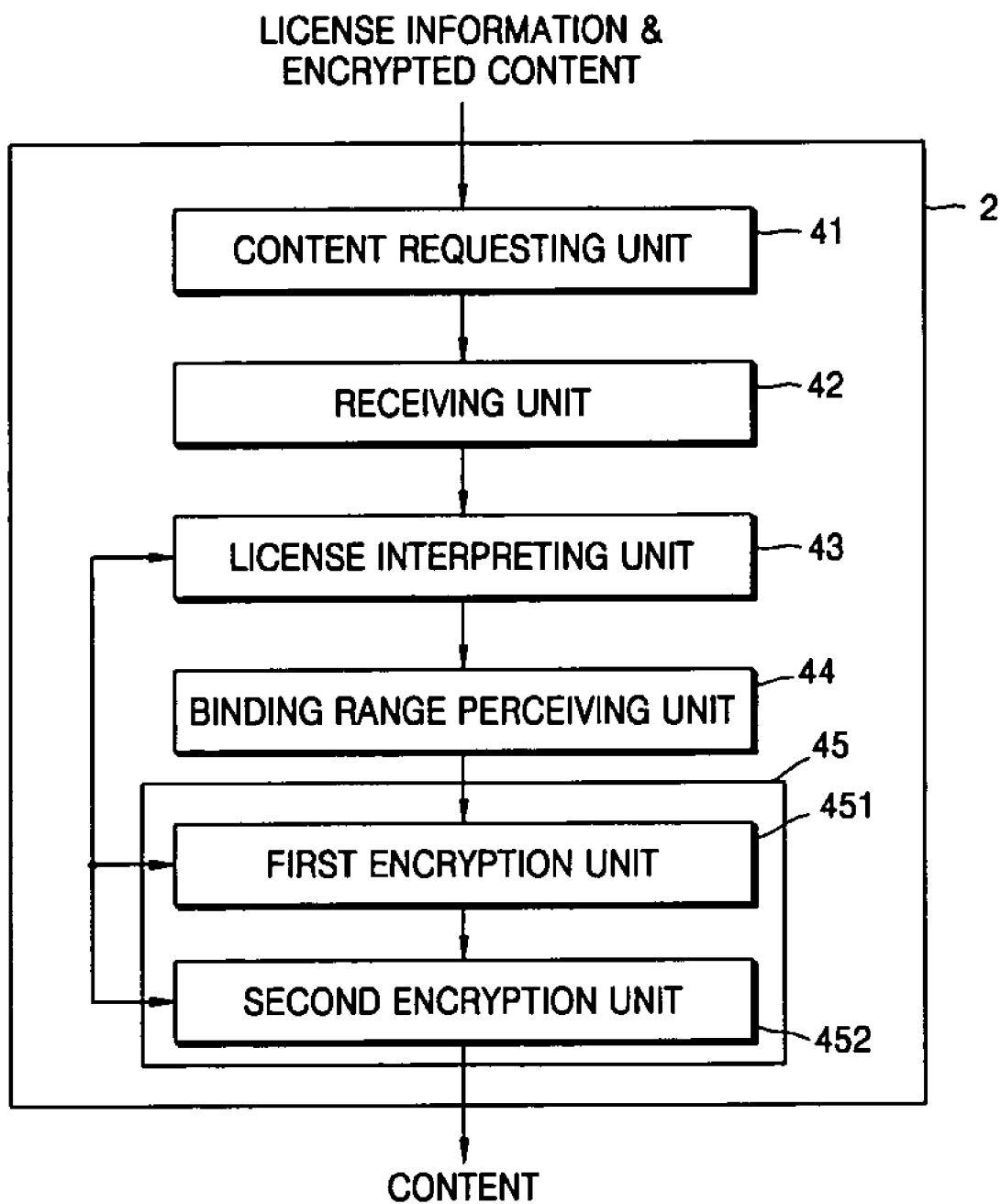
FIG. 4 is a block diagram of an apparatus for decrypting content according to an exemplary embodiment of the present invention.

FIG. 4 is a block diagram of an apparatus for decrypting content according to an embodiment of the present invention. Referring to FIG. 4, the apparatus is installed in the device 2 of FIG. 1, and includes a content requesting unit 41, a receiving unit 42, a license interpreting unit 43, a binding range perceiving unit 44, and a decryption unit 45.

The content requesting unit 41 transmits a request for content to the content server 1 of FIG. 1.

The receiving unit 42 receives license information and encrypted content from the content server 1 in response to the request from the content requesting unit 41.

The license interpreting unit 43 interprets the license information received by the receiving unit 42 according to a license information format such as that illustrated in FIG. 2A, 2B, or 2C, and determines the construction of the license information.

The binding range perceiving unit 44 perceives one of binding ranges of use of the content, and the ID of the perceived binding range, based on the license information interpreted by the license interpreting unit 43. More specifically, the binding range perceiving unit 44 perceives one from among the binding ranges based on the predetermined element commonly applied to the plurality of the ranges among the elements of the license information, i.e., the binding type field, of the license information interpreted by the license interpreting unit 43; and perceives the ID of the perceived binding range with reference to the binding ID field.

For instance, referring to FIG. 2A, the binding range perceiving unit 44 perceives a device from among the plurality of binding ranges of content use, e.g., a device, a domain, or a user, based on the binding type field of the license information 212 interpreted by the license interpreting unit 43; and perceives the ID of the device based on the binding ID field of the license information 212. Referring to FIG. 2B, the binding range perceiving unit 44 perceives a domain from among various types of binding ranges of content use, e.g., a device, a domain, and a user, based on the binding type field of the license information 222 interpreted by the license interpreting unit 43; and perceives the ID of the perceived domain based on the binding ID field. Referring to FIG. 2C, the binding range perceiving unit 44 perceives a user from among the binding ranges of content use, e.g., a device, a domain, and a user, based on the binding type field of the license information 232 interpreted by the license interpreting unit 43, and perceives the ID of the perceived user based on the binding ID field.

The decryption unit 45 decrypts the encrypted content according to a predetermined encryption algorithm based on the binding range perceived by the binding range perceiving unit 44, so that the content can be used within only the perceived binding range. More specifically, the decryption unit 45 decrypts the encrypted content according to the predetermined encryption algorithm based on the ID perceived by the binding range perceiving unit 44, so that the content can be used within only the binding range perceived by the binding range perceiving unit 44.

For instance, referring to FIG. 2A, the decryption unit 45 decrypts the encrypted content according to the predetermined encryption algorithm based on the ID of a device perceived by the binding range perceiving unit 44, so that the content can be available to only the perceived device. Referring to FIG. 2B, the decryption unit 45 decrypts the encrypted content according to the predetermined encryption algorithm based on the ID of a domain perceived by the binding range perceiving unit 44, so that the content can be available to only the perceived domain. Also, referring to FIG. 2C, the decryption unit 45 decrypts the encrypted content according to the predetermined encryption algorithm based on the ID of a user perceived by the binding range perceiving unit 44, so that the content can be available to only the perceived user.

The decryption unit 45 includes a first decryption unit 451 and a second decryption unit 452.

The first decryption unit 451 decrypts a content key encrypted according to a predetermined encryption algorithm, using a decryption key corresponding to the binding range perceived by the binding range perceiving unit 44. In detail, the first decryption unit 451 decrypts the content key encrypted according to the predetermined encryption algorithm, using the decryption key corresponding to the binding range, and in particular, the ID of the binding range which is perceived by the binding range perceiving unit 44, so as to decrypt the content that is encrypted according to the predetermined encryption algorithm to be used within only the perceived binding range.

For instance, referring to FIG. 2A, the first decryption unit 451 decrypts the content key encrypted according to the predetermined encryption algorithm, using a decryption key corresponding to the ID of a device perceived by the binding range perceiving unit 44, so as to decrypt the content encrypted to be available to only the perceived device. Referring to FIG. 2B, the first decryption unit 451 decrypts the content key encrypted according to the predetermined encryption algorithm, using a decryption key corresponding to the ID of a domain perceived by the binding range perceiving unit 44, so as to decrypt the content encrypted to be available to only the perceived domain. Referring to FIG. 2C, the first decryption unit 451 decrypts the content key encrypted according to the predetermined encryption algorithm, using a decryption key according to the ID of a user perceived by the binding range perceiving unit 44, so as to decrypt the content encrypted to be available to only the perceived user.

The ID perceived by the binding range perceiving unit 44 can be used as a decryption key and the format of the ID is determined according to the predetermined encryption algorithm applied to the present invention. For instance, in the present embodiment, when the predetermined encryption algorithm is a secret key cryptographic system, the format of the ID perceived by the binding range perceiving unit 44 is used as a secret key. That is, the first decryption unit 451 decrypts the encrypted content key, using the ID that is recorded in the binding ID field of the license information perceived by the binding range perceiving unit 44.

When the predetermined encryption algorithm uses a public key cryptographic system, the format of the ID perceived by the binding range perceiving unit 44 is a public key. That is, the first decryption unit 451 decrypts the encrypted content key, using a private key matching the ID that is recorded in the binding ID field of the license information perceived by the binding range perceiving unit 44.

The second encryption unit 452 decrypts the encrypted content received by the receiving unit 42, using the content key decrypted by the first decryption unit 451.

Figure 5:
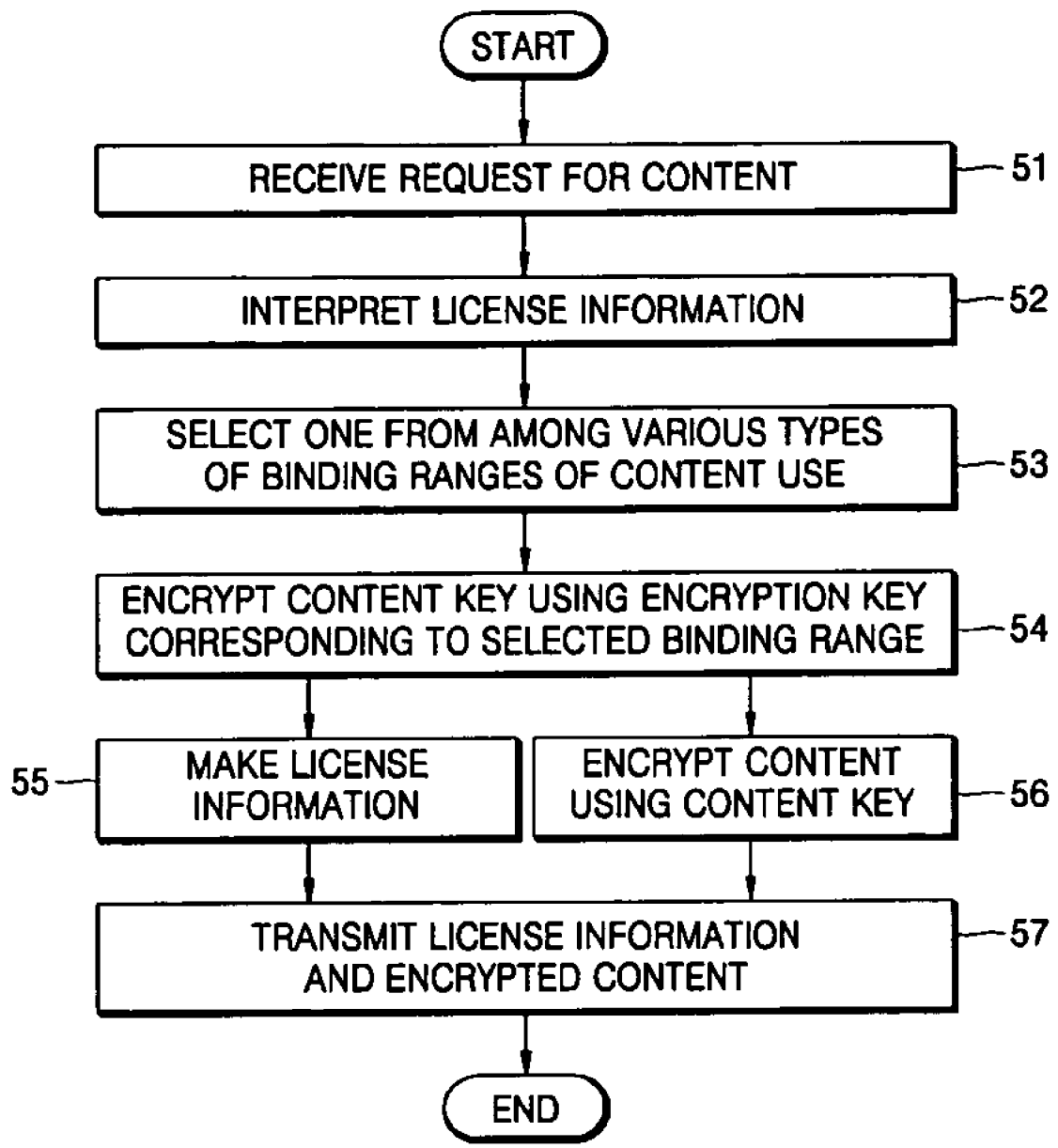
FIG. 5 is a flowchart illustrating a method of encrypting content according to an exemplary embodiment of the present invention.

FIG. 5 is a flowchart illustrating a method of encrypting content according to an exemplary embodiment of the present invention. The method of FIG. 5 includes operations that are performed by the apparatus installed in the content server 1 of FIG. 3 according to a time sequence. Thus, even if described here, the operations performed by the apparatus installed in the content server 1 of FIG. 3 that have been described above can be also applied to the method of FIG. 5.

Referring to FIG. 5, in operation 51, the content server 1 receives a request for content from the device 2.

In operation 52, the content server 1 interprets the license information of the content specified in the request received in operation 51.

In operation 53, the content server 1 selects one of a plurality of binding ranges of use of the content, based on the license information interpreted in operation 52.

In operation 54, the content server 1 encrypts a content key according to a predetermined encryption algorithm, using an encryption key corresponding to the binding range selected in operation 53, so that the content can be available within only the selected binding range.

In operation 55, the content server 1 makes license information that is related to the binding range selected in operation 53 and that contains the content key encrypted in operation 54.

In operation 56, the content server 1 encrypts the content using the content key encrypted in operation 54.

In operation 57, the content server 1 transmits the license information made in operation 55 and the content encrypted in operation 56 to the device 2.

Figure 6:
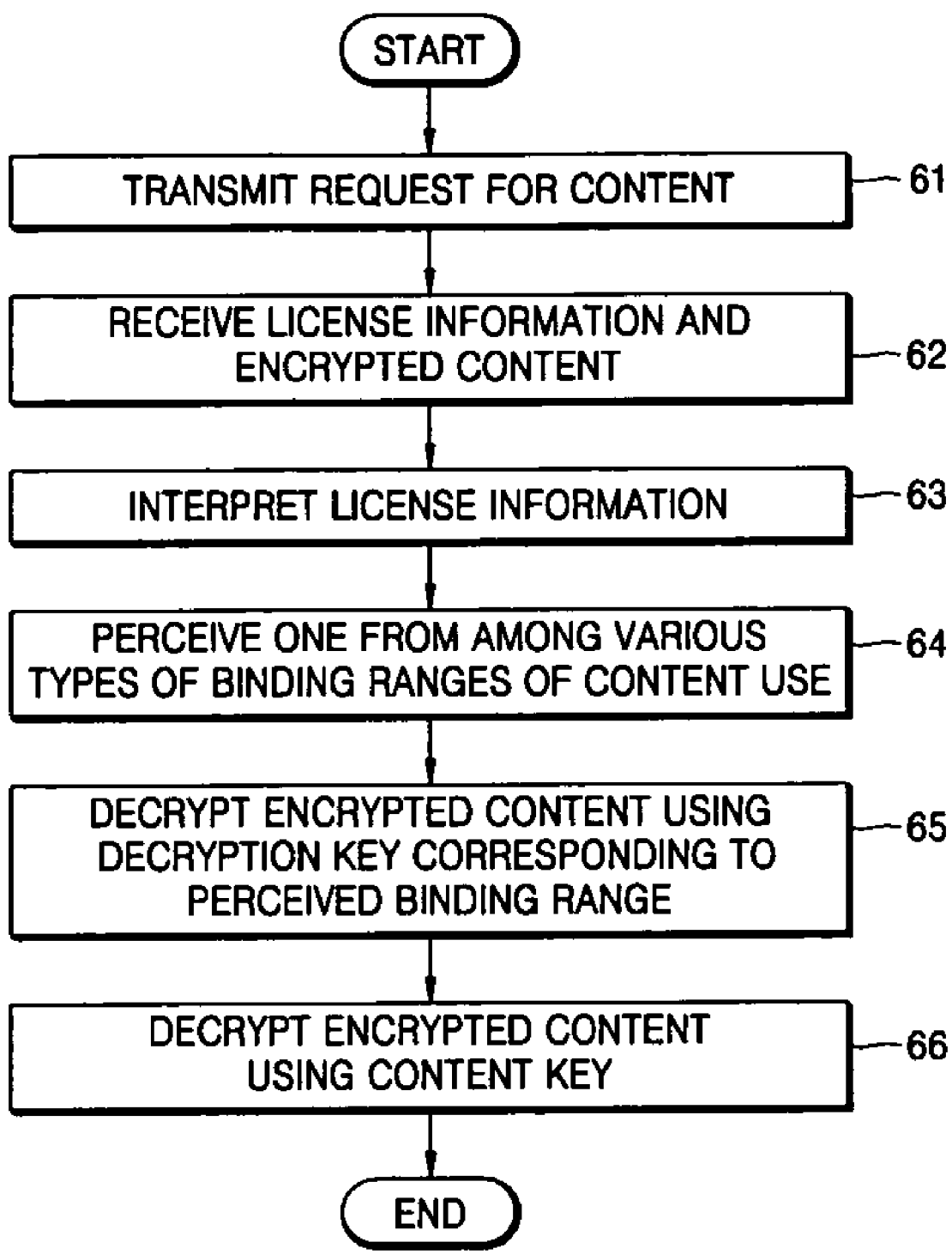
FIG. 6 a flowchart illustrating a method of decrypting content according to an exemplary embodiment of the present invention.

FIG. 6 is a flowchart illustrating a method of decrypting content according to another exemplary embodiment of the present invention. The method of FIG. 6 includes operations that are performed by the apparatus installed in the device 2 of FIG. 4 according to a time sequence. Therefore, even if not described here, the operations performed by the apparatus of FIG. 2 that have been described above can be also applied to the method of FIG. 6.

Referring to FIG. 6, in operation 61, the device 2 transmits a request for content to the content server 1.

In operation 62, the device 2 receives encrypted content and license information thereof from the content server 1, in response to the request transmitted in operation 61.

In operation 63, the device 2 interprets the license information received in operation 62.

In operation 64, the device 2 perceives one of the plurality of binding ranges of use of the content, and the ID of the perceive binding range, based on the license information interpreted in operation 63.

In operation 65, the device 2 decrypts a content key encrypted according to a predetermined encryption algorithm, using a decryption key corresponding to the binding range perceived in operation 64, so that the content can be used within only the perceived binding range.

In operation 66, the device 2 decrypts the encrypted content received in operation 62 using the content key decrypted in operation 65.

The present invention can be embodied as a program that can be executed in a computer, and performed in a general digital computer that runs the program using a computer readable medium. Also, data used in the above exemplary embodiments of the present invention may be recorded on a computer readable medium through various media.

The computer readable medium may be any recording apparatus capable of storing data that is read by a computer system, e.g., a magnetic recording medium (a read-only memory (ROM), a floppy disk, a hard disk, etc.), an optical recording medium CD-ROM, a DVD, etc.), and a carrier wave that transmits data via the Internet, for example.

According to the present invention, a binding range of content use is selected or perceived from a plurality of binding ranges of content use based on the license information of the content, and the content is encrypted or decrypted according to the selected/perceived binding range. Accordingly, it is possible to limit use of the content to binding ranges of use of the content based on the license information of the content, and effectively select a decryption key for decrypting the content.

Also, the present invention has proposed a license information format having a binding type field and a binding ID field that are commonly applied to a plurality of binding ranges of content use, the format being an element of license information of content. Accordingly, it is possible to freely limit a binding range of content use based on only a format of license information of the content.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An encryption method being implemented by a content server and an encrypting apparatus installed in the content server, the encryption method comprising:

receiving, at the content server, a request for content from a requesting device, the content being subject to a license;

selecting a binding range from among a plurality of binding ranges for use of the content, wherein the plurality of the binding ranges comprises one binding range comprising a domain including a plurality of devices and another binding range comprising one of the devices;

wherein the selecting is performed by the content encrypting apparatus based on license information which resides on the content server and includes information of the binding range, and each of the binding ranges limits the use of the content over a range pertaining to a binding type;

encrypting the content according to a predetermined algorithm based on an identification of the selected binding range so that the content is available only within the selected binding range, the encrypting being performed by the content encrypting apparatus; and transmitting the encrypted content from the content server to the requesting device.

2. The encryption method of claim 1, wherein during the selecting of the binding range, the binding range is selected using predetermined elements being applied to the plurality of binding ranges among elements of the license information.

3. The encryption method of claim 2, wherein the predetermined elements comprise:

a first field indicating the binding range; and a second field indicating an identification of the binding range indicated in the first field;

wherein during the selecting the binding range, the binding range is selected based on the first field, wherein the encryption method further comprises recording identification of the selected binding range in the second field; and wherein during the encrypting the content, the content is encrypted based on the identification of the binding range indicated in the second field.

4. The encryption method of claim 1, wherein the encrypting the content comprises:

encrypting a content key using an encryption key corresponding to the selected binding range; and encrypting the content using the content key.

5. The encryption method of claim 1, wherein the plurality of the binding ranges further comprises a user of the domain.

6. An encrypting apparatus comprising:

a hardware processor comprising:

a selecting unit configured to select a binding range among a plurality of binding ranges for use of content, wherein the plurality of the binding ranges comprises one binding range comprising a domain including a plurality of devices and another binding range comprising one of the devices;

wherein the selecting is performed based on license information which resides on the content server and includes information of the binding range, and each of the binding ranges limits the use of the content over a range pertaining to a binding type; and an encryption unit configured to encrypt the content according to a predetermined algorithm based on an identification of the selected binding range so that the content is available within only the selected binding range.

7. The encrypting apparatus of claim 6, wherein the selecting unit selects the binding range based on a predetermined element being applied to the plurality of the binding ranges among elements of the license information.

8. A computer readable recording medium having embodied thereon a program for executing an encrypting method in a computer, wherein the encrypting method comprises:

selecting a binding range among a plurality of binding ranges of content use, wherein the plurality of the binding ranges comprises one binding range comprising a domain including a plurality of devices and another binding range comprising one of the devices;

wherein the selecting is performed based on license information which resides on the content server and includes information of the binding range, wherein each of the binding ranges limits the use of the content over a range pertaining to a binding type; and encrypting content according to a predetermined algorithm based on an identification of the selected binding range so that the content is available within only the selected binding range.

* * * * *